(12) United States Patent
Park

(10) Patent No.: US 11,219,000 B2
(45) Date of Patent: *Jan. 4, 2022

(54) APPARATUS AND METHOD OF UPLINK CONTROL CHANNEL RESOURCE ALLOCATION FOR NEW RADIO

(71) Applicant: KT CORPORATION, Gyeonggi-do (KR)

(72) Inventor: Kyujin Park, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/826,482

(22) Filed: Mar. 23, 2020

(65) Prior Publication Data

US 2020/0221453 A1 Jul. 9, 2020

Related U.S. Application Data

(62) Division of application No. 16/147,530, filed on Sep. 28, 2018, now Pat. No. 10,638,463.

(30) Foreign Application Priority Data

Sep. 29, 2017 (KR) .................. 10-2017-0128188
Nov. 30, 2017 (KR) .................. 10-2017-0162728
Jul. 3, 2018 (KR) .................. 10-2018-0077270

(51) Int. Cl.
*H04J 4/00* (2006.01)
*H04W 72/04* (2009.01)

(52) U.S. Cl.
CPC ...... *H04W 72/0413* (2013.01); *H04W 72/042* (2013.01)

(58) Field of Classification Search
CPC .......... H04W 72/0413; H04W 72/042; H04W 72/0453; H04L 5/0053

(Continued)

(56) References Cited

U.S. PATENT DOCUMENTS 10,356,761 B2 7/2019 Yerramalli et al.
10,638,463 B2* 4/2020 Park .................. H04W 72/0413
(Continued)

FOREIGN PATENT DOCUMENTS

CN 102014505 A 4/2011
CN 102014510 A 4/2011
(Continued)

OTHER PUBLICATIONS

LG Electronics, "Consideration on PUCCH resource allocation for NR", R1-1715883, 3GPP TSG RAN WG1 Meeting NR#3, Nagoya, Japan, Sep. 18-21, 2017.

(Continued)

*Primary Examiner* — Chuong T Ho
(74) *Attorney, Agent, or Firm* — INVENSTONE Patent, LLC

(57) ABSTRACT

Provided are a method of transmitting an uplink control information in a next-generation/5G radio access network. The method may include receiving uplink control channel resource set configuration information to transmit the uplink control information from a base station, determining one of uplink control channel resource sets contained in the uplink control channel resource set configuration information, determining one of uplink control channel resources configuring the determined uplink control channel resource set, and transmitting the uplink control information through the determined uplink control channel resource.

12 Claims, 9 Drawing Sheets

(58) Field of Classification Search
USPC .................................................. 370/329, 330
See application file for complete search history.

(56) References Cited

U.S. PATENT DOCUMENTS

| | | | |
|---|---|---|---|
| 2013/0128826 A1 | 5/2013 | Lin et al. | |
| 2015/0195063 A1* | 7/2015 | Ro | H04L 5/005 370/329 |
| 2016/0338041 A1 | 11/2016 | Li et al. | |
| 2017/0289993 A1 | 10/2017 | Yerramalli et al. | |
| 2018/0270698 A1 | 9/2018 | Babaei et al. | |
| 2018/0270699 A1 | 9/2018 | Babaei et al. | |
| 2018/0270700 A1 | 9/2018 | Babaei et al. | |
| 2018/0279229 A1 | 9/2018 | Dinan et al. | |
| 2018/0279262 A1 | 9/2018 | Babaei et al. | |
| 2018/0279331 A1 | 9/2018 | Shaheen et al. | |
| 2018/0279353 A1 | 9/2018 | Shaheen et al. | |
| 2018/0324678 A1 | 11/2018 | Chen et al. | |
| 2018/0324786 A1 | 11/2018 | Hooli et al. | |
| 2019/0044689 A1 | 2/2019 | Yiu et al. | |
| 2019/0059112 A1 | 2/2019 | Ou et al. | |
| 2019/0098580 A1 | 3/2019 | Babaei et al. | |
| 2019/0132834 A1 | 5/2019 | Yan et al. | |
| 2019/0230685 A1* | 7/2019 | Park | H04W 72/0453 |
| 2019/0268123 A1* | 8/2019 | Ahn | H04L 5/0053 |
| 2020/0059327 A1* | 2/2020 | Kini | H04W 72/042 |
| 2020/0221444 A1* | 7/2020 | Tiirola | H04L 1/1812 |

FOREIGN PATENT DOCUMENTS

| | | |
|---|---|---|
| CN | 102088341 A | 6/2011 |
| CN | 102438319 A | 5/2012 |
| CN | 106301720 A | 1/2017 |
| WO | 2017/075787 A1 | 5/2017 |

OTHER PUBLICATIONS

Mediatek Inc., "Summary of Offline Discussion on Bandwidth Part Operation", R1-1716832, 3GPP TSG RAN WG1 Meeting NR#3, Nagoya, Japan, Sep. 18-21, 2017.
3GPP TS 36.211 V14.3.0, Jun. 2017, pp. 8-75.
U.S. Appl. No. 62/502,550, filed May 5, 2017.
U.S. Appl. No. 62/564,787, filed Sep. 28, 2017.
Qualcomm Incorporated, "Resource allocation and transmit diversity for PUCCH", R1-1716426, TSG-RAN WG1 Meeting #90, Prague, CZ, Aug. 21-25, 2017, pp. 1-14.
Samsung, "PUCCH resource configuration for bandwidth restricted UE", R1-1714539, 3GPP TSG RAN WG1 Meeting #90, Prague, Czechia Aug. 21-25, 2017, pp. 1-14.
State Intellectual Property Office of People's Republic of China, Office Action of corresponding CN Patent Application No. 201811148762.0, dated Dec. 17, 2020.

* cited by examiner

DL CONTROL INFORMATION

APPARATUS AND METHOD OF UPLINK CONTROL CHANNEL RESOURCE ALLOCATION FOR NEW RADIO

CROSS-REFERENCE TO RELATED APPLICATION

The present application is a divisional of pending U.S. patent application Ser. No. 16/147,530 (filed on Sep. 28, 2018), which claims priority under 35 U.S.C. § 119 to Korean Patent Application Nos. 10-2017-0128188 (filed on Sep. 29, 2017), 10-2017-0162728 (filed on Nov. 30, 2017) and 10-2018-0077270 (filed on Jul. 3, 2018), which are hereby incorporated by reference in their entirety.

This application claims the priority benefit of Korean Patent Application No. 10-2017-0128188, filed on Sep. 29, 2017, No. 10-2017-0162728, filed on Nov. 30, 2017 and No. 10-2018-0077270, filed on Jul. 3, 2018 in the Korean Intellectual Property Office, the disclosures of which are incorporated herein by reference in their entirety.

BACKGROUND OF THE INVENTION

1. Field of the Invention

The present disclosure relates to a method of allocating an uplink control channel resource in a next-generation/5G radio access network (hereinafter, referred to as a new radio (NR)).

2. Description of the Related Art

Recently, the 3rd generation partnership project (3GPP) has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for a new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design NR to have flexible frame structures, compared with the LTE/LTE-Advanced.

In particular, there is a need to develop a method for enabling a user device to transmit an uplink channel, such as an uplink control channel and an uplink data channel, to a base station based on a bandwidth part (BWP) when the user device uses various BWPs in NR.

SUMMARY OF THE INVENTION

An object of the present disclosure is to provide an apparatus and method of preventing ambiguity between indication and interpretation of an uplink control channel transceiving resource of a base station and a user equipment, resulted from uplink bandwidth part (hereinafter, referred to as BWP) switching in the NR.

In accordance with an aspect of the present disclosure, a method of a user equipment is provided for transmitting uplink control information. The method may include receiving uplink control channel resource set configuration information for the transmission of the uplink control information from a base station, determining one of uplink control channel resource sets contained in the uplink control channel resource set configuration information, determining one of uplink control channel resources configuring the determined uplink control channel resource set, and transmitting the uplink control information through the determined uplink control channel resource.

In accordance with a further aspect of the present disclosure, a method of a base station may be provided for receiving uplink control information. The method may include transmitting uplink control channel resource set configuration information for the transmission of the uplink control information to a user equipment, and receiving the uplink control information through one of uplink control channel resources configuring one of uplink control channel resource sets contained in the uplink control channel resource set configuration information.

In accordance with another aspect of the present disclosure, a user equipment may be provided for transmitting uplink control information. The user equipment may include a receiver configured to receive uplink control channel resource set configuration information for the transmission of the uplink control information from a base station, a controller configured to determine one of uplink control channel resource sets contained in the uplink control channel resource set configuration information and determine one of uplink control channel resources configuring the determined uplink control channel resource set, and a transmitter configured to transmit the uplink control information through the determined uplink control channel resource.

In accordance with a further aspect of the present disclosure, a base station may be provided for receiving uplink control information. The base station may include a transmitter configured to transmit uplink control channel resource set configuration information for the transmission of the uplink control information to a user equipment, and a receiver configured to receive the uplink control information through one of uplink control channel resources configuring one of uplink control channel resource sets contained in the uplink control channel resource set configuration information.

In accordance with yet another aspect of the present disclosure, it may prevent ambiguity between indication and interpretation of an uplink control channel transceiving resource of a base station and a user equipment, resulted from UL BWP switching in the NR.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

DETAILED DESCRIPTION OF THE EXEMPLARY EMBODIMENTS

Figure 1:
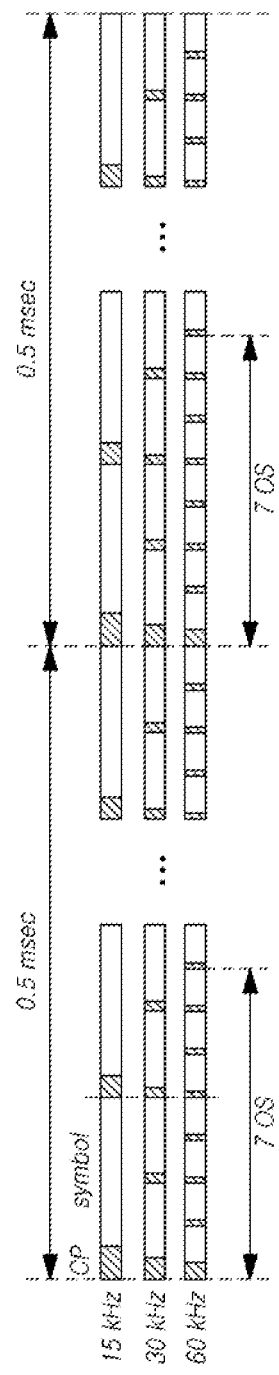
FIG. 1 is a diagram illustrating arrangements of orthogonal frequency division multiple (OFDM) symbols in case of using different subcarrier spacings from each other according to embodiments of the present disclosure.

Hereinafter, the present preferred embodiments of the disclosure will be described in detail with reference to the accompanying drawings. In denoting elements of the drawings by reference numerals, the same elements will be referenced by the same reference numerals although the elements are illustrated in different drawings. In the following description of the disclosure, detailed description of known functions and configurations incorporated herein may be omitted when it may make the subject matter of the disclosure rather unclear.

In the present disclosure, a wireless communication system refers to a system for providing various communication services such as a voice communication service, a packet data service, etc. The wireless communication system includes a user equipment (UE) and a base station (BS).

In the present disclosure, the UE is defined as a generic term including devices using in wireless communication, such as a UE supporting wideband code division multiple access (WCDMA), long term evolution (LTE), high speed packet access (HSPA), international mobile telecommunications (IMT)-2020 (5G or new radio), or the like, or a mobile station (MS) supporting a global system for mobile communications (GSM), a user terminal (UT), a subscriber station (SS), a wireless device, or the like.

The BS or a cell generally refers to a station communicating with the UE. The BS or cell of the present disclosure is defined as a generic term including, but not limited to, all of various coverage areas such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

The BS provides radio coverage and is necessary in each of the above-described various cells. The BS may be classified into two categories. 1) The BS may be an apparatus that covers a megacell, a macrocell, a microcell, a picocell, a femtocell, and a small cell, in association with a wireless area, or 2) the BS may indicate a radio coverage area itself. In case of 1), the BS may be apparatuses providing any radio coverage area and controlled by an identical entity, or apparatuses interacting with each other to cooperatively establish the radio coverage area. According to a method of establishing the radio coverage area, the BS may be a point, a transmission/reception point, a transmission point, a reception point, or the like. In case of 2), the BS may be a radio coverage area itself to transmit or receive a signal from a UE or neighboring BS perspective.

The cell of the present disclosure may refer to a coverage of a signal transmitted from a transmission point or a transmission/reception point, a component carrier having the coverage of the signal transmitted from the transmission point or the transmission/reception point, or the transmission/reception point itself.

The user equipment and the BS of the present disclosure are entities of performing uplink and downlink communications used to embody the technology and technical conceptions described in the present disclosure. The user equipment and the BS are defined as a generic term and not limited to a specific term or word.

The uplink (UL) refers to data transmission and reception from a user equipment to a base station, and the downlink (DL) refers to data transmission and reception from a base station to a user equipment.

The uplink/downlink transmission may be performed using one of i) a time division duplex (TDD) technique that performs transmission by the allocation of different time slots, ii) a frequency division duplex (FDD) technique that performs transmission by the allocation of different frequencies, and iii) both the frequency division duplex (FDD) and the time division duplex (TDD).

Furthermore, according to the related standard, the UL/DL is configured based on a signal carrier or a pair of carriers in the wireless communication system.

UL/DL may transmit control information through a control channel of an uplink or downlink channel, such as a physical DL control channel (PDCCH), a physical UL control channel (PUCCH), and the like. Further, UL/DL may transmit data through a data channel of the uplink or downlink channel, such as a physical DL shared channel (PDSCH), a physical UL shared channel (PUSCH), and the like.

The DL may refer to communication or a communication path from multiple transmission/reception points to a device, or the UL may refer to communication or a communication path from the device to the multiple transmission/reception points. In the DL, a transmitter may be a part of multiple transmission/reception points and a receiver may be a part of the device. In the UL, a transmitter may be a part of the device and a receiver may be a part of multiple transmission/reception points.

Hereinafter, transmission and reception of a signal through a channel such as the PUCCH, the PUSCH, the PDCCH, or the PDSCH, may be described as the transmission and reception of the PUCCH, the PUSCH, the PDCCH, or the PDSCH.

Meanwhile, higher layer signaling includes radio resource control (RRC) signaling for transmitting RRC information containing an RRC parameter.

The BS performs a DL transmission to a UE. The BS may transmit i) downlink control information that includes information on scheduling for receiving a physical DL data channel which is a primary channel for unicast transmission and ii) a physical DL control channel for transmitting DL control information which is for transmitting scheduling approval information for transmission on an UL data channel. Hereinafter, transmission and reception of a signal through each channel may be described as transmission and reception of a corresponding channel.

Any of multiple access techniques may be applied to wireless communication systems of the present disclosure, and therefore no limitation is imposed on them. The multiple access techniques that can be used in wireless communication systems of the present disclosure may include time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

Embodiments according to the present disclosure may be applicable to resource allocation in an asynchronous wireless communication evolving into LTE/LTE-advanced and IMT-2020 from GSM, WCDMA, and HSPA. Furthermore, the embodiments may be applicable to resource allocation in a synchronous wireless communication evolving into CDMA, CDMA-2000, and UMB.

A machine type communication (MTC) device of the present disclosure may refer to a device that is low cost (or low complexity), a user equipment that supports coverage enhancement, or the like. The MTC device of the present disclosure may refer to a device defined as a predetermined category for supporting low costs (or low complexity) and/or coverage enhancement.

In other words, the MTC device of the present disclosure may refer to a low cost (or low complexity) device category/type newly defined in 3GPP Release-13 and performing LTE-based MTC related operations. The MTC device of the present disclosure may refer to a device category/type that is defined in or before 3GPP Release-12 that supports enhanced coverage in comparison with the typical LTE coverage or supports low power consumption, or may refer to a low cost (or low complexity) device category/type newly defined in Release-13. The MTC device may refer to a further enhanced MTC device defined in Release-14.

A narrowband Internet of Things (NB-IoT) device of the present disclosure refers to a device supporting radio access for cellular IoT. NB-IoT technology is aimed at indoor coverage improvement, support for large-scale low-speed devices, low latency sensitivity, very low device costs, low power consumption, and optimized network architecture.

An enhanced mobile broadband (eMBB), massive machine-type communication (mMTC), and ultra reliable and low latency communication (URLLC) are proposed as representative usage scenarios for NR having been discussed in the 3GPP recently.

A frequency, a frame, a subframe, a resource, a resource block (RB), a region, a band, a sub-band, a control channel, a data channel, a synchronization signal, various reference signals, various signals, and various messages associated with NR of the present disclosure may be interpreted as being used in the past or present or as various meanings to be used in the future.

NR (New Radio)

Recently, the 3GPP has approved the "Study on New Radio Access Technology", which is a study item for research on next-generation/5G radio access technology. On the basis of such a study item, the 3GPP have started discussions about frame structure, channel coding & modulation, waveform, multiple access scheme, etc.

It is required to design the NR not only to provide a data transmission rate enhanced as compared with that of LTE/LTE-Advanced, but also to meet various requirements for detailed and specific usage scenarios. In particular, an eMBB, mMTC, and URLLC have been discussed as representative usage scenarios of the NR, and it has been required to design more flexible frame structures as compared with those for LTE/LTE-Advanced in order to meet the requirements of each usage scenario.

Specifically, the eMBB, mMTC, URLLC are considered as representative usage scenarios of the NR. Since each usage scenario imposes a different requirement of data rates, latency, coverage, etc., many discussions have conducted for a technique of efficiently multiplexing radio resource units based on different types of numerology (e.g., a subcarrier spacing (SCS), a subframe, a transmission time interval (TTI), etc.) in order to efficiently satisfy requirements according to usage scenarios through a frequency band of any NR system.

To this end, there also have been many discussions conducted for developing i) a technique of multiplexing numerology having different SCS values based on TDM, FDM or TDM/FDM through one NR carrier and ii) a technique of supporting one or more time units in configuring scheduling units in a time domain.

In this regard, in the NR, a subframe has been defined as one type of time domain structure. As reference numerology to define a subframe duration, a single subframe duration is defined as having 14 OFDM symbols of 15 kHz SCS-based normal CP overhead, like the LTE. Therefore, the subframe in the NR may have a time duration of 1 ms. Unlike the LTE, since the subframe of the NR is an absolute reference time duration, a slot and a mini-slot may be defined as a time unit used for an actual UL/DL data scheduling. In this case, the number of OFDM symbols constituting a corresponding slot, a value of y, has been defined as y=14 regardless of the numerology, but not limited thereto.

Therefore, any slot may have 14 symbols. In accordance with a transmission direction for a slot, all of the symbols may be used for DL transmission or UL transmission, or the symbols may be used in the configuration of a DL portion+a gap+a UL portion.

Further, a mini-slot having fewer symbols than the slot has been defined in any numerologies (or SCS), and, as a result, a short time domain scheduling interval for the transmission and reception of UL/DL data may be configured based on the mini-slot. Also, a long time domain scheduling interval for the transmission and reception of UL/DL data may be configured by slot aggregation.

In particular, in case of transmission and reception of latency-critical data, such as Ultra-reliable low-latency communication (URLLC), when scheduling is performed on a slot basis according to 0.5 ms (7 symbols) or 1 ms (14 symbols) defined in a frame structure based on a numerology having a small SCS value such as 15 kHz, it may be difficult to meet latency requirements. To solve this problem, a mini-slot having fewer OFDM symbols than the slot may be defined so that scheduling for latency-critical data, such as the URLLC, may be performed based on the mini-slot.

Further, as described above, there has been discussions on a technique of scheduling data in accordance with latency requirements based on the length of the slot (or mini-slot) defined in each numerology, by multiplexing and supporting the numerologies using the TDM or FDM technique, which have different SCS values within one NR carrier. For example, as illustrated in FIG. 1, the length of a symbol for 60 kHz SCS is shortened by a fourth of that for 15 kHz SCS, and thus a 60 kHz-based slot is shortened to have a length of about 0.125 ms as compared with a 15 kHz-based slot having a length of 0.5 ms under the same condition that seven OFDM symbols constitute one slot.

As described above, techniques of satisfying each requirement of URLLC and eMBB has been discussed by defining different SCSs or different TTI lengths in the NR.

Wider Bandwidth Operations

A typical LTE system supports a scalable bandwidth operation for an LTE component carrier (CC). An LTE service provider may use a bandwidth of at least 1.4 MHz up to 20 MHz according to a frequency deployment scenario when configuring one LTE CC. Accordingly, an LTE UE supports transmission/reception capabilities of 20 MHz bandwidth for one LTE CC.

Figure 2:
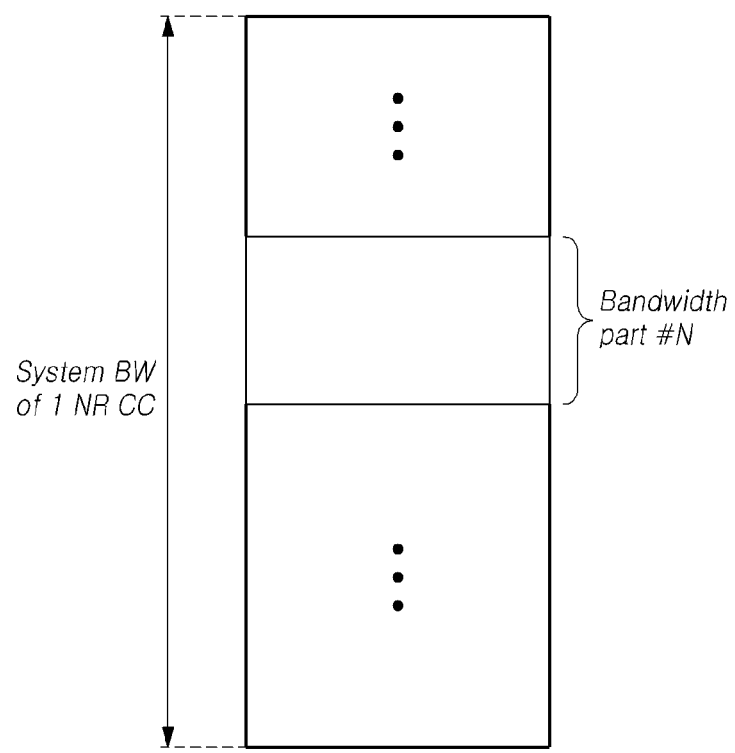
FIG. 2 is a conceptual view of a bandwidth part (BWP) according t embodiments of the present disclosure.

However, the NR has been designed to support UEs each having different transmission/reception bandwidth capability from another in one broadband NR component carrier. Accordingly, as illustrated in FIG. 2, it is required to configure one or more bandwidth parts (BWPs) constituting bandwidths obtained by subdividing an NR CC and to support a wider and flexible bandwidth operation by configuring and activating different BWPs from each other to each UE.

Specifically, in the NR, one or more BWPs may be configured through one serving cell from a view of a UE. The UE may transmit and/or receive UP/DL data by activating one DL BWP and one UP BWP, in the serving cell. Furthermore, in a case where the UE are connected to a plurality of serving cells (e.g., when the UE performs carrier aggregation (CA)), the UE may transmit and/or receive UP/DL data by activating one DL BWP and/or one UL BWP for each serving cell and using a radio resource of each serving cell.

Specifically, an initial bandwidth part (BWP) may be defined for an initial access procedure in any serving cell, and one or more UE-specific BWPs may be configured through RRC signaling dedicated for each UE, and a default bandwidth part (BWP) may be defined for a fallback operation for each UE.

It is possible to define A plurality of downlink and/or uplink BWPs to be simultaneously activated and used according to the configurations of BWPs and the capability of a UE in any serving cell. However, the NR rel-15 defines that only one DL BWP and one UL BWP are activated and used in an UE at any time.

NR PUCCH

In the typical LTE system, a PUCCH is transmitted on a single subframe basis, where the PUCCH is an UL control channel for the transmission of uplink control information (UCI) by a UE. That is, one PUCCH is transmitted through 14 SC-FDMA symbols constituting one subframe in a time domain. In a case where the last symbol is used for an SRS transmission, the PUCCH is transmitted through 13 symbols except for the last symbol.

Furthermore, different PUCCH formats are defined according to payload sizes of UL control information. For example, the different PUCCH formats are defined as follows: i) PUCCH format 1/1a/1b is used to transmit UL control information of one or two bits (e.g., a scheduling request (SR) and a HARQ ACK); ii) PUCCH format 2a/2b is used to transmit an UL control information having a moderate payload size (e.g., CQI/CSI feedback); and PUCCH format 3 or more is used to transmit the feedback of the UL control information having a large payload size when carrier aggregation (CA) is used.

However, the NR defines a PUCCH structure to have various durations in a slot having 14 symbols. For example, the NR defines a long duration PUCCH and a short duration PUCCH according to the number of symbols required to transmit a single PUCCH, N values, in a single slot for the transmission of uplink control information (UCI) by a UE. For the UE to transmit the UCI, the NR defines two types of PUCCHs which are i) a short duration PUCCH transmitted using one to two symbols and ii) a long duration PUCCH transmitted using four to fourteen symbols in a single slot.

Hereinafter, the short and long duration PUCCHs may be refer to as short and long PUCCHs respectively. That is, the short duration PUCCH may be transmitted using one or two symbols, and the long duration PUCCH may be transmitted using four to fourteen symbols in one symbol.

Furthermore, similar to the typical LTE, the NR defines different PUCCH formats according to payload sizes of uplink control information for each of the long duration PUCCH and the short duration PUCCH. For example, for the short duration PUCCH, the NR defines i) a PUCCH format for the transmission of UL control information with a payload size of up to two bits and ii) a PUCCH format for the transmission of UL control information with a payload size exceeding 2 bits. Furthermore, for the long duration PUCCH, the NR defines i) a PUCCH format for the transmission of UL control information with a payload size of up to two bits and ii) a PUCCH format for the transmission of UL control information with a payload size exceeding 2 bits.

As described, for defining a PUCCH structure to transmit UL control information in the NR, it may be required to define a PUCCH duration and a PUCCH format.

In accordance with an embodiment of the present disclosure, a method may be provided for allocating a PUCCH resource for HARQ ACK/NACK feedback or aperiodic CSI reporting by a UE in the NR. In some embodiments of the present disclosure, the PUCCH resource allocation method is described as being applied for HARQ ACK/NACK feedback and aperiodic CSI reporting by a UE, but it is not limited thereto. For example, the PUCCH resource allocation method according to embodiments may be applied for a service request (SR) or periodic CSI reporting.

As described above, in the NR, one or more BWPs may be configured through one serving cell from a UE perspective. For example, at least one DL BWP and at least one UL BWP may be configured according to a transmission direction supported by the serving cell that usesunpaired spectrum (i.e. TDD) or paired spectrum (i.e. FDD).

The NR defines a BS to activate and use only one DL BWP and one UL BWP at a predetermined time for each UE in order for transmitting and receiving each of DL/UL radio channel and signal (e.g. PDCCH/PDSCH, PUSCH/PUCCH etc.) When the serving cell is a DL-only cell or an UL-only cell, the serving cell may activate and use only one or more DL BWPs or only one or more UL BWPs.

Accordingly, in a UE perspective, one or more UL BWPs and/or DL BWPs may be independently provided and activated for a secondary cell (Scell) configured for carrier aggregation, in addition to a primary cell (Pcell) to which the UE is connected first.

As described, when one or more BWPs are configured in an serving cell of an UE, the UE can activate and use one BWP at any time.

Specifically, for a DL transmission and/or reception, the serving cell activates and uses one DL BWP in any DL subframe/slot/mini-slot of one or more DL BWPs configured for a corresponding UE. Likewise, for an UL transmission and/or reception, the serving cell activates and uses one UL BWP in any UL subframe/slot/mini-slot of one or more UL BWPs configured for the UE.

Activation/deactivation indications of the DL BWP and the UL BWP to an UE may be performed through DL control information (DCI) transmitted through a PDCCH. For example, the activation/deactivation of the DL BWP may be performed through DL assignment DL control information containing resource allocation information on a PDSCH.

Furthermore, the activation/deactivation of the UL BWP may be performed through an UL grant containing resource allocation information on a PUSCH.

For example, a UE may receive, from a BS, BWP configuration information on one or more BWP sets constituted by one or more BWPs configured for the UE. Next, the UE may receive, from the BS, DL control information containing information that indicates one of one or more BWPs contained in the one or more BWP sets configured by the BWP configuration information. The UE may receive the PDSCH or transmit the PUSCH or PUCCH through the one BWP indicated in the DL control information.

At this time, the BWP configuration information may be receive from the BS through high layer signaling, such as RRC signaling.

In accordance with an embodiment of the present disclosure, provided are a PUCCH resource allocation method considering a UE-specific BWP based operation and detailed operations of a UE and a BE related thereto. In particular, in connection with the activation/deactivation of the UL BWP, provided is a specific method of allocating a PUCCH resource to prevent ambiguity between indication and interpretation of a PUCCH transceiving resource of a BS and a UE, resulted from UL BWP switching.

In the NR, a BS/network may configure a single PUCCH resource set configured by one or more PUCCH resources for HARQ ACK/NACK feedback or a plurality of PUCCH resource sets, each of which is configured by one or more PUCCH resources, for each UE, and then transmit the configured one or more PUCCH resource sets to each UE through UE-specific higher layer signaling.

As described, when one or multiple PUCCH resource sets are configured for an UE through the UE-specific higher layer signaling, the BS may include PUCCH resource indication information as HARQ ACK/NACK feedback in response to a PDSCH reception at a corresponding UE in DL allocation DL control information and transmit the DL allocation DL control information containing the PUCCH resource indication information when transmitting PDSCH scheduling control information for the UE through a PDCCH.

That is, for each PDSCH transmission for an UE, the BS selects i) one of i) PUCCH resources configuring a single PUCCH resource set configured for the UE or ii) one of PUCCH resources configuring one of multiple PUCCH resource sets and a PUCCH resource set. Then, the BS transmits the selected one PUCCH resource through DL allocation DL control information. Accordingly, the UE may be defined to dynamically allocate a PUCCH resource to be used for HARQ ACK/NACK feedback.

In accordance with an embodiment of the present disclosure, proposed are a method of configuring a PUCCH resource set and a method of indicating the corresponding PUCCH resource.

As a method of configuring one or more PUCCH resource sets for an UE, in configuring one or more PUCCH resource sets for each UE for HARQ ACK/NACK feedback of the UE, it may be defined that one or more separate resource sets are configured for each UL BWP configured for the UE.

Figure 3A:
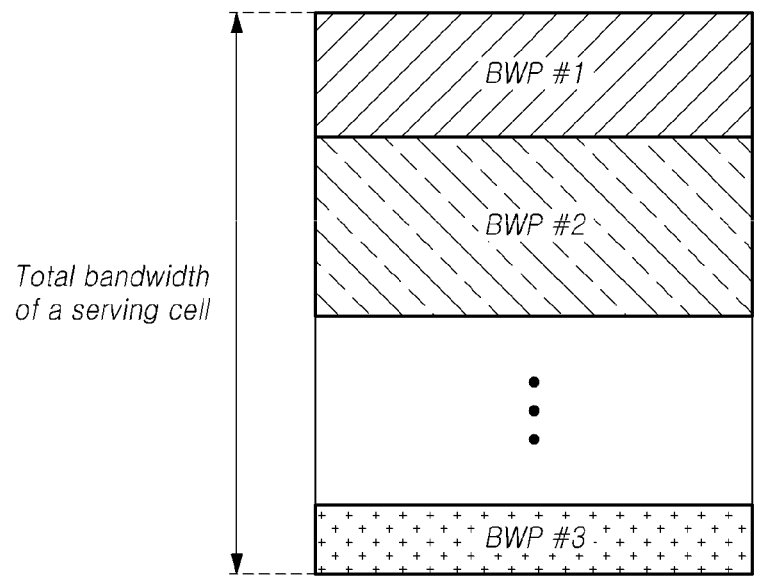
FIG. 3A is a diagram illustrating an example of configuring N BWPs in one serving cell for an user equipment.

For example, as illustrated in FIG. 3A, when N (e.g, N is a natural number greater than 1) UL BWPs for any UE are configured, it may be defined that separate one or multiple PUCCH resource sets are configured for each UL BWP to indicate a PUCCH resource for HARQ ACK/NACK feedback of the UE and then transmitted to the UE through UE-specific higher layer signaling. Although FIG. 3A shows that overlapping between the BWPs in each frequency axis does not occur, one or more BWPs may be configured to overlap with another BWP partially or fully in any frequency axis. However, the present embodiment is not limited to a specific UL BWP configuration.

Figure 3B:
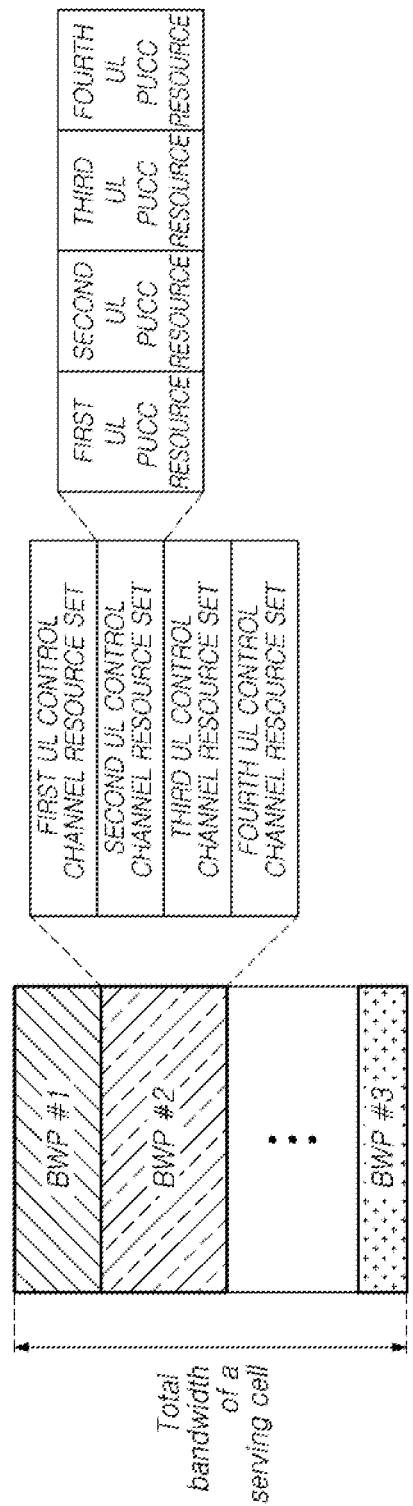
FIG. 3B is a diagram illustrating i) PUCCH resource sets configuring each of N BWPs and ii) PUCCH resources configuring each PUCCH resource set.

Referring to FIG. 3B, the BS may configure total N groups of one or multiple PUCCH resource sets per each BWP for a UE, for example, from one or multiple PUCCH resource sets for a BWP #1, one or multiple PUCCH resource sets for a BWP #2, . . . , up to one or multiple PUCCH resource sets for a BWP #N, where N is an integer number equal to and greater than 1. For example, as illustrated in FIG. 3B, the BWP #2 including one or multiple PUCCH resource sets may be formed of a first to fourth PUCCH resource sets.

As described, each PUCCH resource includes one or multiple PUCCH resource sets configured for each UL BWP through higher layer signaling. Such each PUCCH resource may be defined as PUCCH format configuration information, time/frequency domain PUCCH resource configuration information (or additionally code domain resource configuration information) in the UL BWP, or the like. For example, as illustrated in FIG. 3B, a specific PUCCH resource set, such as a second PUCCH resource set, may be configured by a first to fourth PUCCH resources.

As described above, when one or multiple PUCCH resource sets configure each BWP through the higher layer signaling, in configuring an area of PUCCH resource indication information through the DL allocation DL control information, the BS may include explicitly UL BWP indication information for the transmission of a PUCCH therein.

For example, the PUCCH resource indication information through the DL allocation DL control information may include UL BWP indication information (e.g. BWP index information)+PUCCH resource set indication information (e.g. PUCCH resource set index information) in the corresponding UL BWP+PUCCH resource indication information (e.g. a PUCCH resource index in the PUCCH resource set) to be used by the UE for HARQ ACK/NACK feedback of PUCCH resources configuring the corresponding PUCCH resource set.

In this regard, when a BWP is configured with specific classes of PUCCH resource sets, the PUCCH resource set indication information may be replaced by the specific classification information. For example, when a separate PUCCH resource set is configured for each of a PUCCH format, the PUCCH resource set indication information may include a PUCCH duration, a PUCCH payload size, and the like, each of the corresponding PUCCH format information, PUCCH duration information, PUCCH payload size information, and the like.

For example, as described above, when a PUCCH resource set is configured through RRC signaling, a separate PUCCH resource set for each PUCCH format may be configured, and the PUCCH format indication information for the HARQ ACK/NACK feedback of the UE may be transmitted through the DL allocation DL control information, and thus a resource set for PUCCH resource allocation of the UE may be derived.

For another example, a separate PUCCH resource set may be configured according to a PUCCH payload size to be transmitted by the UE, i.e. the payload size of UL control information, and the PUCCH resource set for the PUCCH resource allocation may be determined according to the UL control information payload size to be transmitted by the UE. As illustrated in FIG. 3B, only the PUCCH resource indication information (e.g. an ACK/NACK resource indication (ARI)) may be transmitted through DL allocation DL control information, and, when the UE determines one or more PUCCH resource sets to interpret it, derived may be a corresponding PUCCH resource set according to an UL control information payload size (UCI payload size) to be transmitted by the UE through a PUCCH resource allocated through the corresponding DL allocation DL control.

For example, the UL control information payload size may be divided into four areas according to the number of bits, and one of a first to fourth PUCCH resource sets may be derived according to the number of bits of the UL control information, as illustrated in FIG. 3B.

Figure 3C:
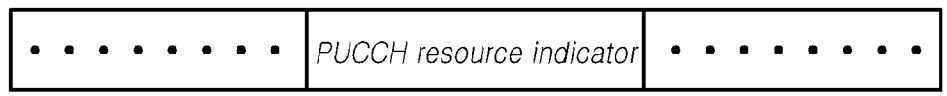
FIG. 3C is a diagram illustrating downlink control information including PUCCH resource indication information.

As illustrated in FIG. 3C, DL allocation DL control information may contain PUCCH resource indication information (PUCCH resource information or a PUCCH resource indicator). The PUCCH resource indication information indicates one UL control channel resource, for the transmission of UL control information, of UL control channel resources configuring an UL control channel resource set. For example, as illustrated in FIG. 3B, in a case where the UL control channel resource set is formed of the first to fourth PUCCH resources, PUCCH resource indication information illustrated in FIG. 3C may indicate one of the four PUCCH resources.

The PUCCH resource set information (or including indication information according to the classification of the PUCCH) and the PUCCH resource index information in the corresponding PUCCH resource set may be encoded in a joint coding scheme and transmitted or received through one information area. The information related to the PUCCH resource set indication may be required only in a case that supports to configure a plurality of PUCCH resource sets in one UL BWP, and when the configuration of only one UCCH resource set per one UL BWP is supported, the PUCCH resource set indication information may be excluded.

As described, when the UL BWP indication information for the transmission of the PUCCH is included in the DL allocation DL control information, the UL BWP indication information may be additionally used as UL BWP activation information of the UE and UL BWP switching indication information resulted therefrom.

For example, the UE may perform UL BWP switching, according to the UL BWP indication information, after a predetermined slot, for example, k slots, from a slot to receive the UE the DL allocation DL control information. In this case, the UL BWP switching means an operation of deactivating a currently-active UL BWP and activating a new UL BWP according to the indication information.

Furthermore, the UE may perform the UL BWP switching (that is, an operation of deactivating a currently-active UL BWP and activating a new UL BWP according to the indication information) according to UL BWP indication information before a predetermined slot, for example, j slots, from a PUCCH transmission slot. In this case, the k value or the j value is an arbitrary integer value of 0 or more and has a certain fixed value. The k value or the j value may be configured by a BS and transmitted through higher layer signaling, or the k value or the j value may be determined according to the capability of the UE. When the UL BWP indication information indicates a currently-active UL BWP, the UE does not perform the operation of the UL BWP switching.

As another method of configuring a PUCCH resource indication information area through DL allocation DL control information, the UL BWP may be determined implicitly. As a result, the PUCCH resource indication information of the DL allocation DL control information may be configured by a PUCCH resource set indication information+PUCCH resource indication information, to be used for HARQ ACK/NACK feedback by the UE, of PUCCH resources configuring the PUCCH resource set, except for the UL BWP indication information.

The PUCCH resource set indication information+the PUCCH resource indication information, to be used for HARQ ACK/NACK feedback by the UE, of PUCCH resources configuring the PUCCH resource set may be configured in the same manner as described above. In a case where the UL BWP is determined implicitly as described above, an UL BWP for the PUCCH transmission may be determined as an active UL BWP of the corresponding UE in a slot for the transmission of the DL allocation DL control information.

As another method of implicitly determining an UL BWP, an UL BWP for the transmission of the PUCCH may be determined as an active UL BWP in a time point to transmit the PUCCH of the corresponding UE, that is, a slot through which the PUCCH is transmitted (or in a case where the PUCCH is transmitted through a plurality of slots, a slot through which the transmission of the PUCCH is started.) As another method of implicitly determining an UL BWP for the PUCCH transmission, UL BWPs associated with each other for the PUCCH transmission for each DL BWP to which DL allocation DL control information for PDSCH resource allocation may be transmitted.

Also, the UL BWPs associated with each other for the PUCCH transmission for each DL BWP through which PDSCH transmission may be performed according to DL allocation DL control information. In this case, the BS may configure UL BWPs associated with each other for the PUCCH transmission for each DL BWP configured for an UE and transmit them to the corresponding UE through a UE-specific high layer signaling or L1 control signaling, or define implicitly a DL BWP-UL BWP association rule.

For example, in a case where the same BWP configuration is performed for both a DL and an UL in a TDD cell, or in a case where the same number of BWP configurations is performed for both a DL and an UL in a TDD/FDD cell, the DL BWP and the UL BWP of the same index may be associated with each other.

As another method of configuring one or more PUCCH resource sets for HARQ ACK/NACK feedback of the UE, the one or more PUCCH resource sets may be commonly configured to one or more UL BWP. That is, when PUCCH resources configuring one PUCCH resource set configured for a UE is defined, each of the PUCCH resources configuring the PUCCH resource set may be configured with one or more PUCCH resources defined in all UL BWPs configured for the UE.

When a BS configures each of one or more PUCCH resources configuring one or more PUCCH resource sets for an UE, information on an UL BWP configured by the one or more PUCCH resources may be contained in each PUCCH resource.

Accordingly, each PUCCH resource configuring one or multiple PUCCH resource sets configured through the higher layer signaling for an UE may be defined as PUCCH format configuration information, UL BWP configuration information, and time/frequency domain PUCCH resource configuration information in the UL BWP (or additionally code-domain resource configuration information), or the like.

In this case, PUCCH resource indication information transmitted through the DL allocation DL control information, as in the case of the implicit UL BWP indication, may be configured by PUCCH resource set indication information (for example, PUCCH resource set index information)+ PUCCH resource indication information to be used for HARQ ACK/NACK feedback by the UE among PUCCH resources configuring the PUCCH resource set (for example, a PUCCH resource index in a PUCCH resource set), or only PUCCH resource indication information to be used for HARQ ACK/NACK feedback by the UE among PUCCH resources configuring one or more PUCCH resource sets (for example, a PUCCH resource index in a PUCCH resource set.)

Likewise, when a BWP is configured with specific classes of PUCCH resource sets, the PUCCH resource set indication information may be replaced by the specific classification information.

For example, when a separate PUCCH resource set is configured for each of a PUCCH format, a PUCCH duration, a PUCCH payload size, and the like, each of the corresponding PUCCH format information, PUCCH duration information, PUCCH payload size information, and the like may be used in place of each of the PUCCH resource set indication information.

The PUCCH resource set information (or, including indication information according to the classification of the PUCCH) and the PUCCH resource index information in the corresponding PUCCH resource set may be encoded in a joint coding scheme and transmitted or received through one information area. The information related to the PUCCH resource set indication may be necessary only in a case of supporting the configuration of a plurality of PUCCH resource sets for each UE. The PUCCH resource set indication information may be excluded in a case of supporting the configuration of only one UCCH resource for each UE.

Additionally, when configuration information on PUCCH resources configuring PUCCH resource sets configured through high layer signaling contains UL BWP configuration information, according to PUCCH resource allocation indicated by PUCCH resource indication information of DL allocation DL control information, as in the case of the explicit UL BWP indication, the UE may perform an UL BWP activation or an UL BWP switching operation to an UL BWP configured by the one or more PUCCH resources.

Additionally, as described above, when PUCCH resource sets for HARQ ACK/NACK feedback of the UE for each UL BWP are configured, or when one or more PUCCH resource sets are commonly configured in one or more UL BWPs, each PUCCH resource configuring the one or more PUCCH resource sets may be allocated for aperiodic CSI feedback of the UE.

Specifically, aperiodic CSI reporting of any UE may be triggered by the BS through DL allocation DL control information. For this purpose, when a DL allocation DL control information format for an UE is defined, an information area for triggering aperiodic CSI reporting of the UE may be defined to be included therein. In a case where the aperiodic CSI reporting of the UE is triggered through the aperiodic CSI reporting indication information area, the aperiodic CSI reporting information may be multiplexed and then transmitted, along with HARQ ACK/NACK feedback information on a PDSCH through the one or more PUCCH resources according to the PUCCH resource allocation information indicated through the DL allocation DL control information. That is, the PUCCH resource set configuration may be a common PUCCH resource set configuration for HARQ ACK/NACK feedback and aperiodic CSI reporting.

In addition, apart from the configuration of one or more PUCCH resource sets for the HARQ ACK/NACK feedback, a BE/network may configure one or more PUCCH resource sets for aperiodic CSI reporting and transmit the configured one or more PUCCH resource sets to each UE through UE-specific High layer signaling. That is, one or multiple PUCCH resource sets for only aperiodic CSI feedback for each UE may be configured and transmitted to each UE through UE-specific High layer signaling.

In this case, one or more PUCCH resource sets for the aperiodic CSI feedback may be separately configured for each PUCCH format or for each PUCCH duration, in the same manner as the PUCCH resource set configuration method for the HARQ ACK/NACK feedback, or be configured regardless of that.

When one or more separate PUCCH resource sets for aperiodic CSI reporting are configured, as described above, one or more PUCCH resource sets for the aperiodic CSI reporting may be configured for each UL BWP, or one or more PUCCH resource sets for the aperiodic CSI reporting may be commonly configured in one or more UL BWPs.

In this regard, in a case where one or more PUCCH resource sets for separate aperiodic CSI reporting are configured, the PUCCH resource allocation for the HARQ ACK/NACK feedback through the DL allocation DL control information described above may be applied to PUCCH resource allocation for the aperiodic CSI reporting. Additionally, an operation described above may be applied to an UL BWP activation or a UE operation related to an UL BWP switching.

Additionally, when aperiodic CSI reporting through an UL grant is triggered, radio channel indication information (i.e., a PUSCH or PUCCH) for the transmission of aperiodic CSI reporting information by a UE may be included.

As described above, the method of the PUCCH resource set configuration and the method of the corresponding PUCCH resource indication have been discussed, referring to FIGS. 2 to 3C. Hereinafter, referring to FIGS. 4 to 7, methods of transmitting and receiving UL control information by a UE and/or a BS, and the related UE and BS will be described in detail.

Figure 4:
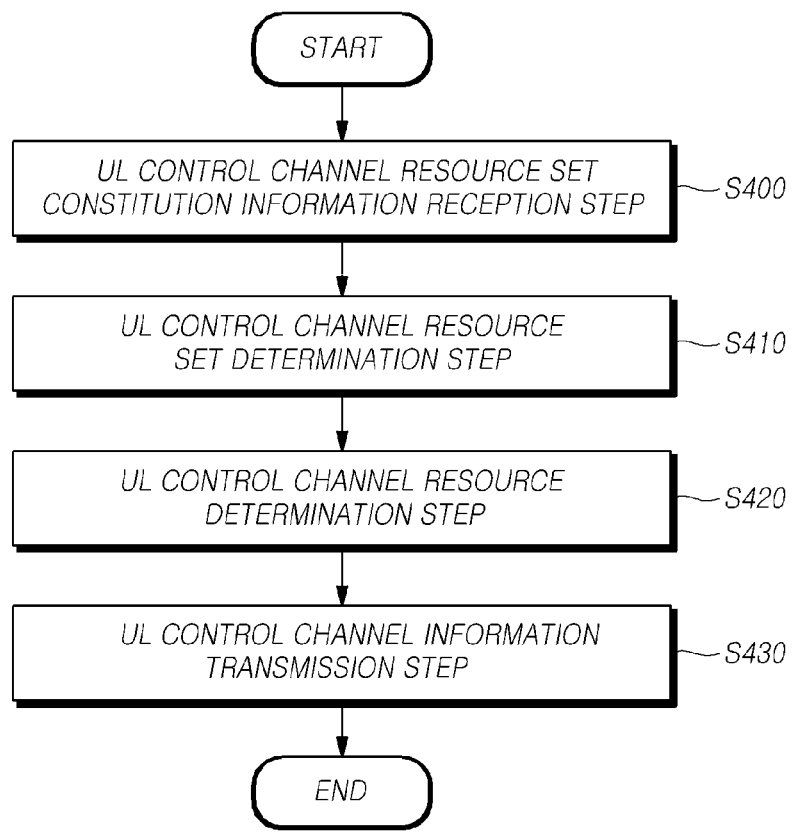
FIG. 4 is a flowchart illustrating a method of a user equipment for transmitting uplink control information according to embodiments of the present disclosure.

FIG. 4 is a flowchart showing a method of a UE for transmitting UL control information b according to embodiments of the present disclosure.

Referring to FIG. 4, a UE receives, from a BS, UL control channel resource set configuration information for transmitting the UL control information S400.

One or more UL control channel resource sets may be configured for each UL BWP configured for a UE. The UL BWP may be activated through DL control information.

Specifically, a corresponding serving cell for a DL transmission and/or reception activates and uses one DL BWP contained in any DL subframe/slot/mini-slot of one or more DL BWPs configured for a corresponding UE. Likewise, a corresponding serving cell for an UL transmission and/or reception activates and uses one UL BWP contained in an UL subframe/slot/mini-slot of one or more UL BWPs configured for a corresponding UE.

Activation/deactivation indications of the DL BWP and the UL BWP to an UE may be performed through DL control information (DCI) transmitted through a PDCCH. Specifically, the activation/deactivation of the DL BWP may be performed through DL assignment DL control information containing resource allocation information on a PDSCH. Furthermore, the activation/deactivation of the UL BWP may be performed through an UL grant including resource allocation information on a PUSCH.

For example, a UE may receive BWP configuration information on one or more BWP sets configured by one or more BWPs configured for the UE from a BS. Next, the UE may receive, from the BS, DL control information containing information for indicating one of one or more BWPs contained in the one or more BWP sets configured by the BWP configuration information. The UE may receive the PDSCH or transmit the PUSCH or PUCCH through the one BWP indicated in the DL control information.

At this time, the BWP configuration information may be receive from the BS through high layer signaling, such as RRC signaling.

In the NR, a BS/network may configure a single PUCCH resource set configured by one or more PUCCH resources for HARQ ACK/NACK feedback or a plurality of PUCCH resource sets, each of which is configured by one or more PUCCH resources, for each UE, and then transmit the configured one or more PUCCH resource sets to each UE through UE-specific higher layer signaling.

In a case where one or multiple PUCCH resource sets for an UE through the UE-specific higher layer signaling are configured, the BS may transmit corresponding DL allocation DL control information including PUCCH resource indication information for HARQ ACK/NACK feedback by the UE in response to a corresponding PDSCH reception when transmitting PDSCH scheduling control information for the UE through a PDCCH.

Furthermore, the UE determines one of UL control channel resource sets contained in UL control channel resource set configuration information S410.

In step S410, when the UL control channel resource sets to transmit the UL control information are determined, the UE may determine one of the UL control channel resource sets according to the size of the UL control information.

Furthermore, the UE determines one of UL control channel resources contained in the determined one UL control channel resource set S420.

Additionally, the UE may receive from the BS DL control information containing information indicating one, for the transmission of the UL control information, of UL control channel resources configuring UL control channel resource sets.

At this time, the one UL control channel resource for the UL control information transmission of the UL control channel resources contained in the determined UL control channel resource set may be indicated from the BS through the DL control information.

As described above, the UE may determine, for each PDSCH transmission, one of PUCCH resources contained in a single PUCCH resource set configured for the UE, or determine one of a plurality of PUCCH resource sets configured for the UE and one of PUCCH resources contained in the corresponding PUCCH resource set, and then dynamically allocate a PUCCH resource.

Specifically, as a method of configuring PUCCH resource sets for an UE, in configuring PUCCH resource sets for each UE for HARQ ACK/NACK feedback of the UE, separate resource sets may be configured for each UL BWP configured for the UE.

For example, as illustrated in FIG. 3A, in a case where N (N is a natural number greater than 1) UL BWPs for an UE are configured, separate PUCCH resource sets to each UL BWP for a PUCCH resource indication for HARQ ACK/NACK feedback of the UE may be configured and transmitted to the UE through UE-specific higher layer signaling.

Referring to FIG. 3B, the BS may configure, for each BWP for a UE, total N PUCCH resource sets, for example, from PUCCH resource sets for a BWP #1, PUCCH resource sets for a BWP #2, . . . , up to PUCCH resource sets for a BWP #N. For example, as illustrated in FIG. 3B, the BWP #2 including PUCCH resource sets may be configured by a first to fourth PUCCH resource sets.

In this case, each PUCCH resource configuring PUCCH resource sets configured for each UL BWP through higher layer signaling may be defined as PUCCH format configuration information, time/frequency domain PUCCH resource configuration information (or additionally code domain resource configuration information) in the UL BWP, or the like. For example, as illustrated in FIG. 3B, a second PUCCH resource set may be configured by a first to fourth PUCCH resources.

Furthermore, when a BWP is configured with specific classes of PUCCH resource sets, the PUCCH resource set indication information may be replaced by the specific classification information. For example when a separate PUCCH resource set is configured for each of a PUCCH format, a PUCCH duration, a PUCCH payload size, and the like, each of the corresponding PUCCH format information, PUCCH duration information, PUCCH payload size information, and the like may be used in place of each of the PUCCH resource set indication information.

That is, a separate PUCCH resource set may be configured according to a PUCCH payload size to be transmitted by the UE, i.e. the payload size of UL control information, and the PUCCH resource set for the PUCCH resource allocation may be determined according to the UL control information payload size to be transmitted by the UE. As illustrated in FIG. 3B, only the PUCCH resource indication information (e.g. an ACK/NACK resource indication (ARI)) may be transmitted through DL allocation DL control information, and, when the UE determines one or more PUCCH resource sets to interpret it, derived may be a corresponding PUCCH resource set according to an UL control information payload size (UCI payload size) to be transmitted by the UE through a PUCCH resource allocated through the corresponding DL allocation DL control.

For example, the UL control information payload size may be divided into four areas according to the number of bits, and one of a first to fourth PUCCH resource sets may be derived according to the number of bits of the UL control information, as illustrated in FIG. 3B.

As illustrated in FIG. 3C, DL allocation DL control information may contain PUCCH resource indication information (PUCCH resource information or a PUCCH resource indicator). The PUCCH resource indication information indicates one UL control channel resource, for the transmission of UL control information, of UL control channel resources configuring an UL control channel resource set. For example, as illustrated in FIG. 3B, in a case where the UL control channel resource set is configured by the first to fourth PUCCH resources, PUCCH resource indication information illustrated in FIG. 3C may indicate one of the four PUCCH resources.

The various methods described above referring to FIGS. 2 to 3C may be applied to a specific PUCCH resource set configuration method and a corresponding PUCCH resource indication in some embodiments of the present disclosure.

The UE transmits the UL control information through the determined the UL control channel resource S430.

Figure 5:
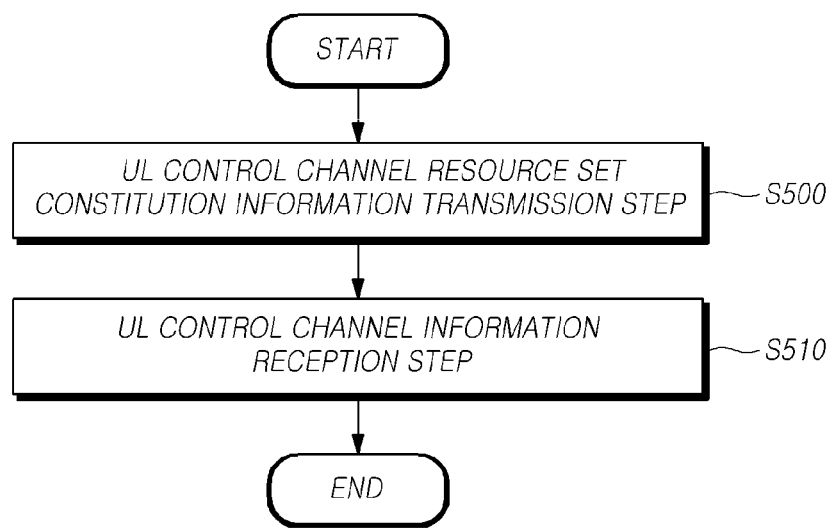
FIG. 5 is a flowchart illustrating a method of a base station for receiving uplink control information according to embodiments of the present disclosure.

FIG. 5 is a flowchart of a BS for receiving UL control information according to some embodiments of the present disclosure.

Referring to FIG. 5, a BS transmits to a UE UL control channel resource set configuration information for the transmission of the UL control information S500.

As described above, one or more UL control channel resource sets may be configured for each UL BWP configured for a UE. The UL BWP may be activated through DL control information.

Specifically, a corresponding serving cell for a DL transmission and/or reception activates to use one DL BWP contained in any DL subframe/slot/mini-slot of one or more DL BWPs configured for a corresponding UE. Likewise, the corresponding serving cell for an UL transmission and/or reception activates to use one UL BWP contained in any UL subframe/slot/mini-slot of one or more UL BWPs configured for the corresponding UE.

Activation/deactivation indications of the DL BWP and the UL BWP to an UE may be performed through DL control information (DCI) transmitted through a PDCCH. Specifically, the activation/deactivation of the DL BWP may be performed through DL assignment DL control information containing resource allocation information on a PDSCH. Furthermore, the activation/deactivation of the UL BWP may be performed through an UL grant containing resource allocation information on a PUSCH.

For example, the UE may receive BWP configuration information on BWP sets configured by BWPs configured for the UE from the BS. Next, the UE may receive DL control information containing information indicating one of BWPs contained in the BWP sets configured by the BWP configuration information from the BS. The UE may receive the PDSCH, or transmit the PUSCH or PUCCH through the one BWP indicated in the DL control information.

At this time, the BWP configuration information may be receive from the BS through high layer signaling, such as RRC signaling.

In the NR, a BS/network may configure a single PUCCH resource set configured by PUCCH resources for HARQ ACK/NACK feedback or a plurality of PUCCH resource sets, each of which is configured by PUCCH resources, for each UE, and then transmit the configured PUCCH resource sets to each UE through UE-specific higher layer signaling. In a case where PUCCH resource sets for an UE through the UE-specific higher layer signaling are configured, when transmitting PDSCH scheduling control information for the UE through a PDCCH, the BS may transmit corresponding DL allocation DL control information including PUCCH resource indication information for HARQ ACK/NACK feedback by the UE in response to a corresponding PDSCH reception.

Furthermore, the BS receives UL control information through one of UL control channel resources configuring one of UL control channel resources contained in UL control channel resource set configuration information S510.

As described above, the UL control channel resource sets for transmitting the UL control information may be determined as one of the UL control channel resource sets according to the size of the UL control information.

As described above, the BS may transmit to the UE DL control information containing information indicating one, for the transmission of the UL control information, of UL control channel resources configuring UL control channel resource sets.

At this time, for the UL control information transmission, the one of the UL control channel resources configuring the UL control channel resource sets may be indicated to the UE through the DL control information.

That is, the BS selects, for each PDSCH transmission for an UE, one of PUCCH resources configuring a single PUCCH resource set configured for the UE, or one of PUCCH resources configuring one of PUCCH resource sets and a PUCCH resource set, configured for the UE. Then, the BS transmits the selected PUCCH resource through DL allocation DL control information. Accordingly, the UE dynamically may allocate a PUCCH resource to be used for HARQ ACK/NACK feedback.

In accordance with an embodiment of the present disclosure, proposed are a method of configuring a PUCCH resource set and a method of indicating the corresponding PUCCH resource.

As a method of configuring one or more PUCCH resource sets for an UE, in configuring PUCCH resource sets for each UE for HARQ ACK/NACK feedback of the UE, one or more separate resource sets may be configured for each UL BWP configured for the UE.

For example, as illustrated in FIG. 3A, in a case where N (N is a natural number greater than 1) UL BWPs for an UE are configured, separate PUCCH resource sets to each UL BWP for a PUCCH resource indication for HARQ ACK/NACK feedback of the UE may be configured and transmitted to the UE through UE-specific higher layer signaling.

Referring to FIG. 3B, the BS may set, for each BWP for a UE, total N PUCCH resource sets, for example, from PUCCH resource sets for a BWP #1, PUCCH resource sets for a BWP #2, . . . , up to one or multiple PUCCH resource sets for a BWP #N. For example, as illustrated in FIG. 3B, the BWP #2 including PUCCH resource sets, may be configured by a first to fourth PUCCH resource sets.

In this case, each PUCCH resource configuring PUCCH resource sets configured for each UL BWP through higher layer signaling may be defined as PUCCH format configuration information, time/frequency domain PUCCH resource configuration information (or additionally code domain resource configuration information) in the UL BWP, or the like. For example, as illustrated in FIG. 3B, a second PUCCH resource set may be configured by a first to fourth PUCCH resources.

In this regard, when a BWP is configured with specific classes of PUCCH resource sets, the PUCCH resource set indication information may be replaced by the specific classification information. For example, when a separate PUCCH resource set is configured to each of a PUCCH format, a PUCCH duration, a PUCCH payload size, and the like, each of the corresponding PUCCH format information, PUCCH duration information, PUCCH payload size information, and the like may be used in place of each of the PUCCH resource set indication information.

That is, a separate PUCCH resource set may be configured according to a PUCCH payload size to be transmitted by the UE, i.e. the payload size of UL control information, and the PUCCH resource set for the PUCCH resource allocation may be determined according to the UL control information payload size to be transmitted by the UE. As illustrated in FIG. 3B, only the PUCCH resource indication information (e.g. an ACK/NACK resource indication (ARI) may be transmitted through DL allocation DL control information, and, when the UE determines one or more PUCCH resource sets to interpret it, derived may be a corresponding PUCCH resource set according to an UL control information payload size (UCI payload size) to be transmitted by the UE through a PUCCH resource allocated through the corresponding DL allocation DL control.

For example, the UL control information payload size may be divided into four areas according to the number of bits, and one of a first to fourth PUCCH resource sets may be derived according to the number of bits of the UL control information, as illustrated in FIG. 3B.

As illustrated in FIG. 3C, DL allocation DL control information may contain PUCCH resource indication information (PUCCH resource information or a PUCCH resource indicator). The PUCCH resource indication information indicates one UL control channel resource, for the transmission of UL control information, of UL control channel resources configuring an UL control channel resource set. For example, as illustrated in FIG. 3B, in a case where the UL control channel resource set is configured by the first to fourth PUCCH resources, PUCCH resource indication information illustrated in FIG. 3C may indicate one of the four PUCCH resources.

The various methods described above referring to FIGS. 2 to 3C may be applied to a specific PUCCH resource set configuration method and a corresponding PUCCH resource indication in some embodiments of the present disclosure.

Figure 6:
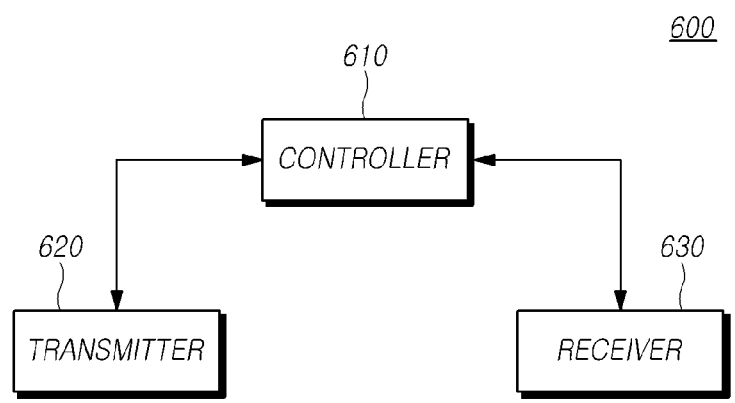
FIG. 6 is a diagram illustrating a base station according to embodiments of the present disclosure.

FIG. 6 is a diagram illustrating a BS according to embodiments of the present disclosure.

Referring to FIG. 6, a BS 600 includes a controller 610, a transmitter 620, and a receiver 630.

In a method of allocating UL control channel resources for an UE in the NR, the controller 610 is configured to control overall operations so that separate PUCCH resource sets are configured for each UL BWP configured for the UE.

The transmitter 620 and the receiver 630 are used to transmit and receive signals, messages, and data necessary for carrying out some embodiments as described above, to and from the UE.

The transmitter 620 transmits to the UE UL control channel resource set configuration information for the transmission of UL control information.

One or more UL control channel resource sets may be configured for each UL BWP configured for the UE.

The UL BWP may be activated through DL control information.

The receiver 630 receives UL control information through one of one or more UL control channel resources configuring one of UL control channel resources contained in UL control channel resource set configuration information.

The one or more UL control channel resource sets for transmitting the UL control information may be determined as one of the UL control channel resource sets according to the size of the UL control information.

The BS may transmit to the UE DL control information containing information indicating one, for the transmission of the UL control information, of UL control channel resources configuring one or more UL control channel resource sets.

At this time, the one, for the UL control information transmission, of the UL control channel resources configuring the UL control channel resource sets may be indicated to the UE through the DL control information.

Figure 7:
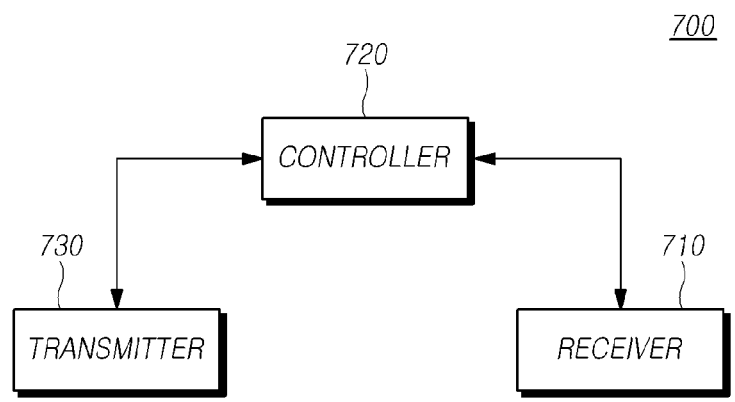
FIG. 7 is a diagram illustrating a user equipment according to embodiments of the present disclosure.

FIG. 7 is a diagram illustrating a UE according to embodiments of the present disclosure.

Referring to FIG. 7, a UE 700 includes a receiver 710, a controller 720 and a transmitter 730.

The receiver 710 receives DL control information and data, messages through a corresponding channel from a BS.

Furthermore, in a method of allocating one or more UL control channel resources for any UE in the NR, the controller 720 is configured to control overall operations of the UE so that separate one or more PUCCH resource sets are configured for each UL BWP configured for the UE.

The transmitter 730 transmits UL control information and data, messages through a corresponding channel to the BS.

The controller 720 determines one of one of UL control channel resource sets contained in UL control channel resource set configuration information, and determines one of UL control channel resources configuring the determined one UL control channel resource set.

The UL control channel resource set(s) may be configured for each UL BWP configured for the UE.

The UL BWP may be activated through the DL control information.

When the one or more UL control channel resource sets for transmitting the UL control information are determined, the controller 720 may determine one of the UL control channel resource sets according to the size of the UL control information.

The receiver 710 receives from the BS UL control channel resource set configuration information for the transmission of UL control information.

The receiver 710 receives from the BS DL control information containing information indicating one, for the transmission of the UL control information, of UL control channel resources configuring UL control channel resource sets. At this time, one UL control channel resource, for the UL control information transmission, of UL control channel resources configuring the determined UL control channel resource set may be indicated from the BS through the DL control information.

The transmitter 730 transmits the UL control information through the determined UL control channel resource.

The standardized specifications or standard documents related to the embodiments described above have been omitted in order to simplify the description but constitute a part of the present disclosure. Accordingly, it should be construed that the incorporation of the content of the standardized specifications and part of the standard documents into the detailed description and claims is included within the scope of the present disclosure.

The features, structures, configurations, and effects described in the present disclosure are included in at least one embodiment but are not necessarily limited to a particular embodiment. A person skilled in the art can apply the features, structures, configurations, and effects illustrated in the particular embodiment embodiments to another one or more additional embodiment embodiments by combining or modifying such features, structures, configurations, and effects. It should be understood that all such combinations and modifications are included within the scope of the present disclosure Although the exemplary embodiments have been described for illustrative purposes, a person skilled in the art will appreciate that various modifications and applications are possible without departing from the essential characteristics of the present disclosure. For example, the specific components of the exemplary embodiments may be variously modified. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Moreover, the terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

What is claimed is:

1. A method of transmitting uplink (UL) control information by a user equipment (UE), the method comprising:
   receiving, from a base station, UL control channel resource set configuration information for UL control information transmission;
   determining one of UL control channel resource sets contained in the received UL control channel resource set configuration information;
   determining one of UL control channel resources contained in the determined UL control channel resource set; and
   transmitting UL control information through the determined UL control channel resource,
   wherein the determining of the one of the UL control channel resource sets is performed based on a size of the UL control information, and
   wherein the UL control channel resource set configuration information is received through UE specific radio resource control (RRC) signaling.

2. The method according to claim 1, wherein the UL control channel resource sets are configured for each UL bandwidth part (BWP) configured for the UE.

3. The method according to claim 2, wherein the each UL BWP is activated through downlink (DL) control information.

4. The method according to claim 1, further comprising:
   receiving, from the base station, downlink (DL) control information containing information indicating the one of the UL control channel resources for the UL control information transmission,
   wherein the one of the UL control channel resources is indicated from the base station through the DL control information.

5. A method of receiving uplink (UL) control information by a base station, the method comprising:
   transmitting, to a user equipment (UE), UL control channel resource set configuration information for UL control information; and
   receiving the UL control information through one of UL control channel resources in one of UL control channel resource sets contained in the transmitted UL control channel resource set configuration information,
   wherein the one of the UL control channel resource sets for the UL control information transmission is determined based on a size of the UL control information, and
   wherein the UL control channel resource set configuration information is transmitted through UE specific radio resource control (RRC) signaling.

6. The method according to claim 5, wherein the UL control channel resource sets are configured for each UL bandwidth part (BWP) configured for the UE.

7. The method according to claim 6, wherein the each UL BWP is activated through downlink (DL) control information.

8. The method according to claim 5, further comprising:
   transmitting, to the user equipment, downlink (DL) control information containing information that indicates the one of the UL control channel resources for the UL control information transmission,
   wherein the one of the UL control channel resources is indicated to the UE through the DL control information.

9. A user equipment (UE) for transmitting uplink (UL) control information, comprising:
   a receiver configured to receive, from a base station, UL control channel resource set configuration information for UL control information transmission;
   a controller configured to determine one of UL control channel resource sets contained in the received UL control channel resource set configuration information, and determine one of UL control channel resources configuring the determined one UL control channel resource set; and
   a transmitter configured to transmit the UL control information through the determined UL control channel resource,
   wherein the determining of the one of the UL control channel resource sets is performed based on a size of the UL control information, and
   wherein the UL control channel resource set configuration information is received through UE specific radio resource control (RRC) signaling.

10. The UE according to claim 9, wherein the UL control channel resource sets are configured for each UL bandwidth part (BWP) configured for the UE.

11. The UE according to claim 10, wherein the each UL BWP is activated through downlink (DL) control information.

12. The UE according to claim 9, wherein the receiver receives, from the base station, DL control information containing information that indicates the one of the UL control channel resources for the UL control information transmission,
   wherein the one of the UL control channel resources is indicated from the base station through the DL control information.

* * * * *